(12) United States Patent
Tomita et al.

(10) Patent No.: US 8,937,423 B2
(45) Date of Patent: Jan. 20, 2015

(54) DISK MOTOR AND ELECTRIC POWER TOOL

(75) Inventors: Hirohisa Tomita, Hitachinaka (JP);
Hideyuki Tanimoto, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 299 days.

(21) Appl. No.: 13/457,122

(22) Filed: Apr. 26, 2012

(65) Prior Publication Data

US 2012/0274175 A1 Nov. 1, 2012

(30) Foreign Application Priority Data

Apr. 26, 2011 (JP) ................. 2011-098063

(51) Int. Cl.
*H02K 3/26* (2006.01)
*H02K 13/04* (2006.01)
*H02K 23/54* (2006.01)
*H02K 13/00* (2006.01)
*H02K 23/32* (2006.01)

(52) U.S. Cl.
CPC ............. *H02K 13/006* (2013.01); *H02K 3/26* (2013.01); *H02K 23/32* (2013.01); *H02K 23/54* (2013.01)
USPC ............... 310/268; 310/50; 310/91; 310/233; 310/237

(58) Field of Classification Search
CPC ....... H02K 3/26; H02K 13/006; H02K 23/54; H02K 23/32
USPC ................. 310/50, 91, 233, 237, 261.1, 268
IPC .................. H02K 3/26, 13/04, 23/54
See application file for complete search history.

(56) References Cited

U.S. PATENT DOCUMENTS

| | | | | |
|---|---|---|---|---|
| 3,524,250 A | * | 8/1970 | Burr | 29/597 |
| 3,524,251 A | * | 8/1970 | Burr | 29/598 |
| 3,525,008 A | * | 8/1970 | Burr | 310/268 |
| 3,558,947 A | * | 1/1971 | Burr | 310/154.06 |
| 3,575,624 A | * | 4/1971 | Keogh | 310/268 |
| 4,701,655 A | * | 10/1987 | Schmider | 310/237 |
| 7,772,733 B2 | * | 8/2010 | Chen | 310/114 |
| 2002/0067102 A1 | * | 6/2002 | Dunn | 310/268 |
| 2005/0035681 A1 | * | 2/2005 | Faltin | 310/268 |
| 2006/0082232 A1 | * | 4/2006 | Sesselmann et al. | 310/83 |
| 2007/0247017 A1 | * | 10/2007 | Bumby | 310/268 |
| 2011/0241457 A1 | * | 10/2011 | Muller et al. | 310/50 |
| 2012/0080974 A1 | * | 4/2012 | Tanimoto | 310/208 |
| 2012/0274175 A1 | * | 11/2012 | Tomita et al. | 310/261.1 |

FOREIGN PATENT DOCUMENTS

JP 3636700 B2 4/2005

* cited by examiner

*Primary Examiner* — John K Kim
(74) *Attorney, Agent, or Firm* — McDermott Will & Emery LLP

(57) ABSTRACT

A disk motor and an electric power tool in which positioning of a coil disk with respect to a commutator disk can be carried out while reliably ensuring insulating properties are provided. A disk motor having: an output shaft part; a coil disk that is provided with a coil pattern and provided coaxially to the output shaft part; a commutator disk that is provided with a commutator pattern and provided coaxially to the output shaft part; and a positioning pin that is electrically insulated from the coil disk and the commutator disk, is engaged with the output shaft part and the coil disk, and carries out positioning of the coil disk with respect to the output shaft part, and an electric power tool having the disk motor are provided.

8 Claims, 5 Drawing Sheets

DISK MOTOR AND ELECTRIC POWER TOOL

CROSS-REFERENCE TO RELATED APPLICATION

The present application claims priority from Japanese Patent Application No. 2011-098063 filed on Apr. 26, 2011, the content of which is hereby incorporated by reference to this application.

TECHNICAL FIELD OF THE INVENTION

The present invention relates to a disk motor and an electric power tool in which the disk motor is mounted.

BACKGROUND OF THE INVENTION

A conventional disk motor is mainly composed of: an output shaft; a coil disk which is fixed to the output shaft, has an approximately circular plate shape, and has a coil pattern printed thereon; a commutator disk to which electric power is supplied by brushes; and magnets disposed so as to be opposed to the coil pattern (for example, Japanese Patent No. 3636700 (Patent Document 1)).

In this disk motor, the commutator disk and the coil disk are connected with conductive pins to carry out positioning of the commutator disk and the coil disk, and electric power is supplied to the coil disk. In this configuration in which the commutator disk and the coil disk are electrically connected with the pins, electrical conduction between the pins and other parts such as the output shaft has to be prevented. Therefore, the pins are covered with insulating tubes to suppress the short-circuit with the other parts.

SUMMARY OF THE INVENTION

When they are insulated with the insulating tubes, the thickness of the insulating tube serves as an insulating distance, but this thickness cannot provide sufficient insulation in some cases. Therefore, an object of the present invention is to provide a disk motor and an electric power tool in which positioning of the coil disk with respect to the commutator disk can be carried out while reliably ensuring insulation properties.

For the solution of the above-described problem, the present invention provides a disk motor including: an output shaft part; a coil disk that is provided with a coil pattern and provided coaxially to the output shaft part; a commutator disk that is provided with a commutator pattern and provided coaxially to the output shaft part; and a positioning part that is electrically insulated from the coil disk and the commutator disk and carries out positioning of either one or both of the coil disk and the commutator disk with respect to the output shaft part in a rotating direction.

According to such a configuration, the precision of positioning of the output shaft part, the coil disk, and the commutator disk can be ensured while maintaining insulating performance.

In the disk motor having the above-described configuration, preferably, the output shaft part has a flange that coaxially and integrally rotates, and the coil disk and the commutator disk are attached to the flange.

According to such a configuration, the coil disk and the commutator disk can be easily attached to the output shaft part.

Also, preferably, the positioning part is a positioning pin configured in a pin shape, in either one or both of the coil disk and the commutator disk, a disk-side positioning hole into which the positioning part is inserted is formed, and a flange-side positioning hole into which the positioning pin is inserted is formed in the flange.

According to such a configuration, positioning can be easily carried out.

Also, preferably, the coil disk is disposed on a first-end side in an axial direction of the flange, the commutator disk is disposed on a second-end side in the axial direction of the flange, and the positioning part is engaged across only the flange and the coil disk.

According to such a configuration, the positioning part can be configured to have a length that minimally ranges across the flange and the coil disk, and it is not required to have a length that reaches the commutator disk. Therefore, the commutator disk is not required to have a configuration to be engaged with the positioning part, and the configuration can be simplified.

Also, preferably, a coil-side through hole is formed in the coil disk, a commutator-side through hole is formed in the commutator disk, and a conductive part electrically connecting the coil disk and the commutator disk is inserted in the coil-side through hole and the commutator-side through hole.

According to such a configuration, the commutator disk and the coil disk can be easily connected.

Also, preferably, an insulating hole in which the conductive part is inserted is formed in the flange, and the insulating hole is formed so that an inner surface defining the insulating hole and the conductive part are away from each other by a predetermined distance or more.

According to such a configuration, short-circuit between the flange and the conductive part can be reliably prevented.

Also, preferably, the conductive part is composed of a conductive member group including a plurality of conductive members, and the conductive member group is inserted in one insulating hole.

According to such a configuration, the insulating hole can be easily formed. Since a large hole is formed as a result, the distance from the conductive member to the inner surface of the insulating hole can be increased.

Also, the conductive part may have a plurality of conductive member groups, each group including a plurality of conductive members, and the positioning part may be disposed between the conductive member groups mutually adjacent in a circumferential direction of the output shaft part.

According to such a configuration, the part between the conductive member groups which is an redundant part can be utilized.

Also, preferably, the coil disk has an input terminal and an output terminal conducted to a coil constituting the coil pattern, and in the plurality of conductive members, a first conductive member and a second conductive member adjacent to the first conductive member are connected to the input terminal and the output terminal, respectively.

For the solution of the above-described problem, the present invention provides an electric power tool including: the disk motor and a distal-end tool attachment part to which a distal-end tool can be attached and which is driven by the disk motor.

According to the disk motor and the electric power tool of the present invention, positioning of the coil disk with respect to the commutator disk can be carried out while reliably ensuring insulating properties.

BRIEF DESCRIPTIONS OF THE DRAWINGS

DESCRIPTIONS OF THE PREFERRED EMBODIMENT

Figure 1:
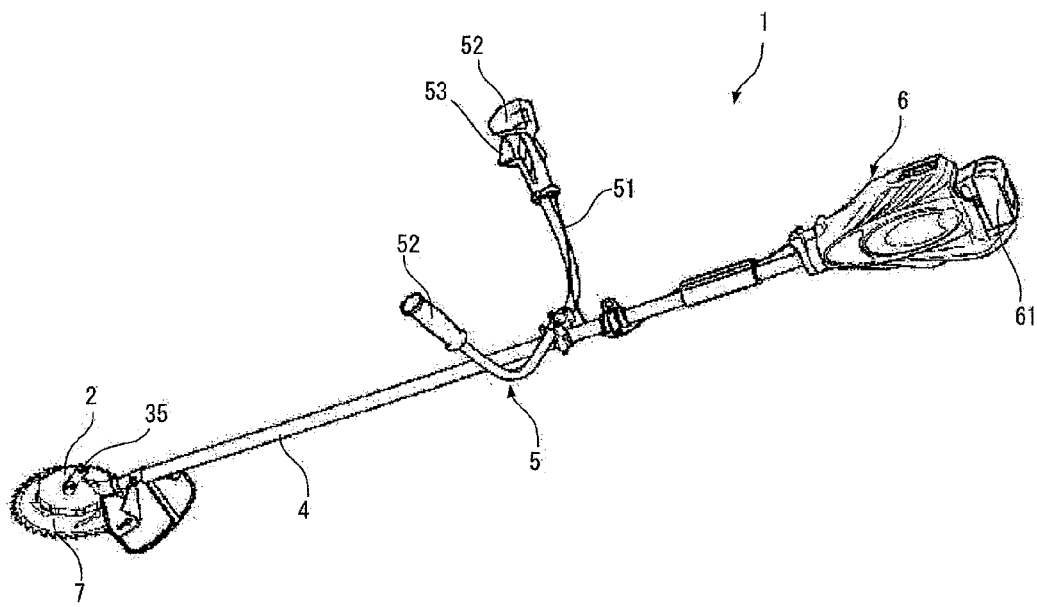
FIG. 1 is an external appearance view of an electric power tool according to an embodiment of the present invention.

Hereinafter, a disk motor and a grass cutter 1 serving as an electric power tool of an embodiment of the present invention will be described with reference to FIG. 1 to FIG. 4. The grass cutter 1 shown in FIG. 1 is mainly composed of a head housing 2, the disk motor 3 (FIG. 2), a pipe part 4, a handle part 5, and a power-supply part 6 and is an electric power tool which carries out mowing operations with a mowing blade 7 attached to an output shaft part 31 described later.

Figure 2:
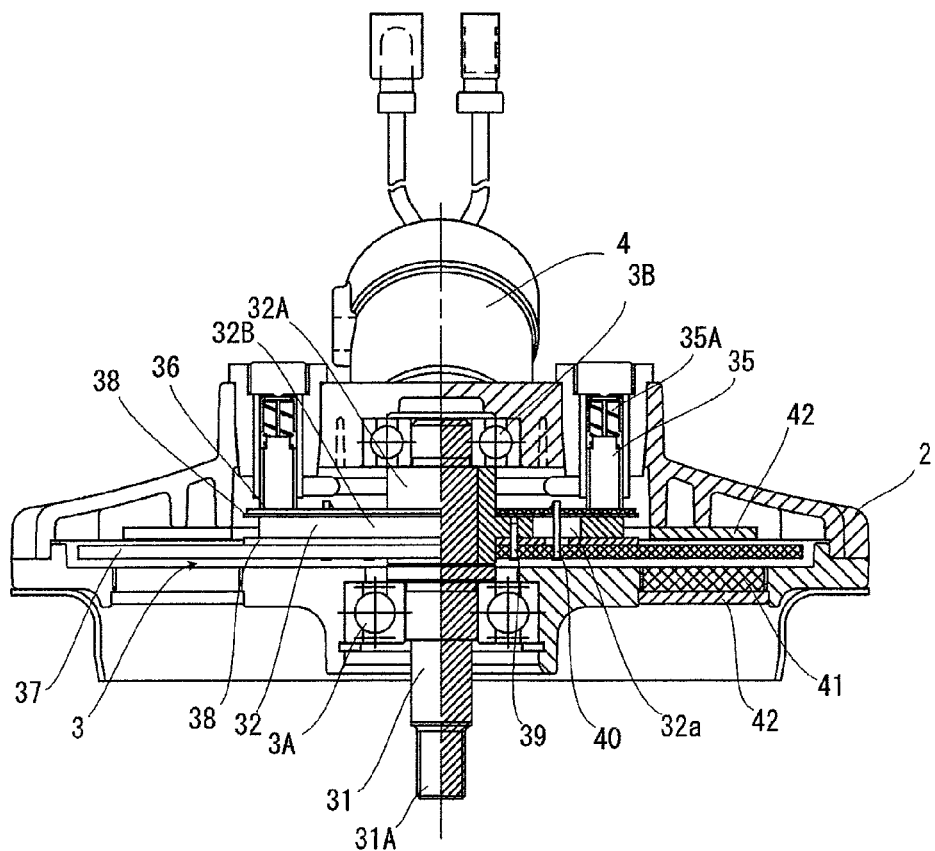
FIG. 2 is a cross-sectional view of a head housing of the electric power tool according to the embodiment of the present invention.

As shown in FIG. 2, the disk motor 3 is housed in the head housing 2 and is mainly composed of the output shaft part 31, a rotor 33 (FIG. 3), a stator having magnets 41 and a yoke 42, and brushes 35. The output shaft part 31 is rotatably supported by the head housing 2 with a bearing 3A which is located on a first-end side of an axial direction and a bearing 3B which is located on a second-end side of the axial direction, and a male screw 31A is provided on the first-end side of the axial direction. In the following description, the side of the male screw 31A (first-end side) in the axial direction of the output shaft part 31 serves as a lower side to define the top-bottom direction. The mowing blade 7 (FIG. 1) is fixed to the male screw 31A with a fastener (not shown) so as to coaxially and integrally rotate.

Figure 3:
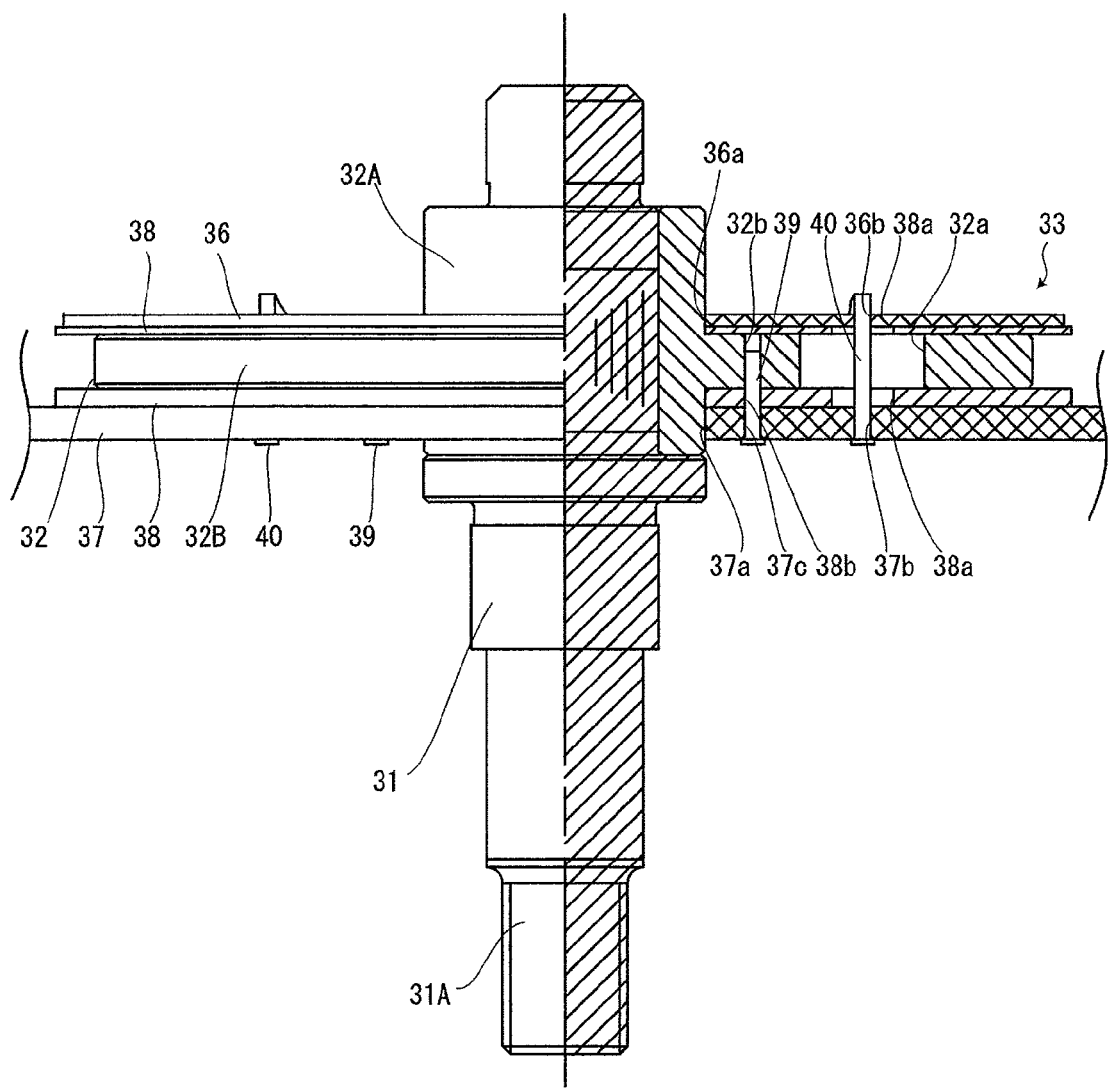
FIG. 3 is a partial cross-sectional view of a disk motor of the electric power tool according to the embodiment of the present invention.

As shown in FIG. 3, a flange 32 is provided to be press-fitted at a position between the bearing 3A and the bearing 3B in the output shaft part 31 so as to be coaxially and integrally rotated with the output shaft part 31. The flange 32 is composed of a cylindrical part 32A, which has a cylindrical shape and is press-fitted to the output shaft part 31, and a circular plate part 32B, which is provided so as to be projected radially outwardly from an approximately center position of the cylindrical part 32A in the top-bottom direction and has a circular plate shape.

In the circular plate part 32B, insulating holes 32a and flange-side positioning holes 32b to which conductive pins 40 and a positioning pin 39, which will be described later, are to be correspondingly inserted are formed. The insulating hole 32a is formed to have a long-hole shape along the circumferential direction of the circular plate part 32B, and the insulating hole is defined so that the inner surface of the insulating hole 32a is away from a later-described conductive pin group 40A by 2.4 mm or more serving as a predetermined distance in the state in which the conductive pin group 40A is inserted to the center of the insulating hole 32a.

Figure 4:
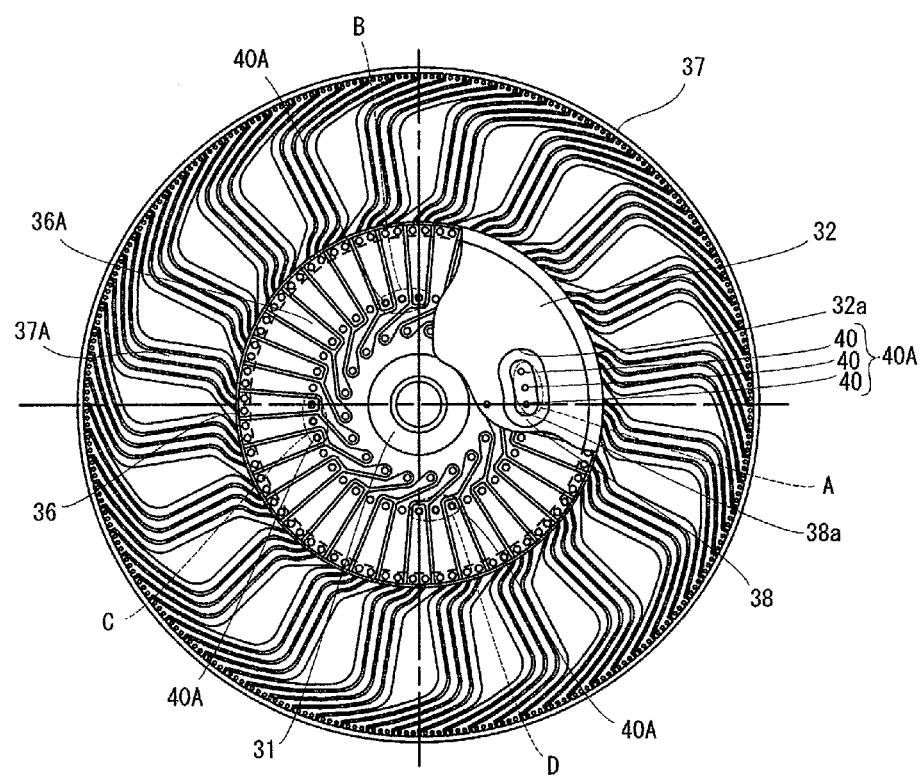
FIG. 4 is a partially-cut-away plan view showing a rotor and a flange of the disk motor of the electric power tool according to the embodiment of the present invention.

The flange-side positioning hole 32b is formed so as to be located on an inner side of the insulating hole 32a in a radial direction of the circular plate part 32B. In FIG. 4, the insulating holes 32a are formed at a region A, a region B, a region C, and a region D, respectively, and the flange-side positioning holes 32b are formed at four locations in the circular plate part 32B at concentric positions, at equal intervals in the circumferential direction, and in the same shape so as to be located on an radially inner side of the region A, the region B, the region C, and the region D.

As shown in FIG. 3, the rotor 33 has a commutator disk 36, a coil disk part 37, insulating plates 38, the positioning pins 39, and the conductive pins 40 and is attached to the flange 32. The commutator disk 36 has an approximately circular plate shape and is fixed to the flange 32 so that the axial core thereof and the axial core of the output shaft part 31 match with each other, and as shown in FIG. 4, an upper surface thereof is provided with commutator patterns 36A serving as contact parts with the brushes 35. As shown in FIG. 3, an insertion hole 36a to which the part of the cylindrical part 32A above the circular plate part 32B is inserted is formed at the center of the commutator disk 36, and commutator-side pin holes 36b serving as commutator-side through holes to which the upper ends of the conductive pins 40 are to be inserted are formed at the positions away from the center by a predetermined distance. As shown in FIG. 4, the commutator-side pin holes 36b are formed at three locations in each of the regions A to D in four directions of the commutator disk 36 so as to have mutually the same shape, and the three commutator-side pin holes 36b formed in each of the regions are arranged at equal intervals in the circumferential direction.

The coil disk part 37 is formed by stacking and mutually bonding four coil disks having an approximately circular plate shape, and as shown in FIG. 3, the coil disk part is bonded/fixed to the flange 32 so that the axial core thereof matches the axial core of the output shaft part 31. An insertion hole 37a to which the part of the cylindrical part 32A below the circular plate part 32B is inserted is formed at the center of the coil disk part 37, and coil-side pin holes 37b which are coil-side through holes to which the lower-end sides of the conductive pins 40 are inserted are formed at the positions away from the center by a predetermine distance. Each of the four coil disks is provided with a plurality of coil patterns 37A (FIG. 4). Each of the coil patterns 37A has a linear part extending in a radial direction of the coil disk and is connected to input terminals and output terminals (not shown) provided on the coil disk. The above-described coil-side pin holes 37b are formed respectively at the positions at which the input terminals and the output terminals are provided. The coil-side pin holes 37b are formed at the locations corresponding to the plurality of commutator-side pin holes 36b on a plane orthogonal to the top-bottom direction. More specifically, at three locations in each of the regions A to D, the coil-side pin holes 37b are formed so as to be arranged at equal intervals in the circumferential direction. The above-described input terminals and output terminals (not shown) are provided at the adjacent coil-side pin holes 37b in each of the regions A to D.

Moreover, in the coil disk part 37, disk-side positioning holes 37c are formed on the inner side of the regions A to D, respectively. On a plane orthogonal to the top-bottom direction, the disk-side positioning holes 37c match the flange-side positioning holes 32b formed in the circular plate part 32B.

The insulating plates 38 are interposed between the commutator disk 36 and the circular plate part 32B and between the coil disk part 37 and the circular plate part 32B, insulate the commutator disk 36 and the circular plate part 32B from each other, insulate the coil disk part 37 and the circular plate part 32B from each other, and are bonded/fixed thereto with an adhesive agent. Also, holes 38a and long holes 38b through which the positioning pins 39 and the conductive pins 40 are respectively inserted are formed in the insulating plates 38.

The positioning pins 39 which are positioning parts are made of metal. The positioning pins are inserted to the flange-side positioning holes 37c when the coil disk part 37 is to be attached to the circular plate part 32B via the insulating plate 38 in the state in which the positioning pins are attached and fixed to the disk-side positioning holes 37c of the coil disk part 37 in advance. In this manner, the positioning of the coil disk part 37 with respect to the flange 32 is carried out. The positioning pins 39 are provided at the positions away from the commutator patterns 36A and the coil patterns 37A on a plane to ensure the insulating properties.

The conductive pins 40 which are conductive parts are made of metal having electrical conductivity. The three adjacent conductive pins are inserted in each of the insulating holes 32a, penetrate through the flange 32, are inserted in the commutator-side pin holes 36b and the coil-side pin holes 37b, and are electrically connected by soldering to the commutator patterns 36A (FIG. 4) and the coil patterns 37A (FIG. 4), respectively. The three conductive pins 40 inserted in each of the insulating holes 32a are defined as the conductive pin group 40A.

As shown in FIG. 2, the stator is composed of the magnets 41 and the yoke 42. The magnets 41 are supported by the head housing 2, are positioned above and below the linear parts of the coil patterns 37A in the coil disk part 37, and are arranged concentrically about the center axis of the output shaft part 31 and at equal intervals in the circumferential direction. Also, the magnets 41 are disposed so that polarities of adjacent magnets are different from each other and the polarities of the magnets 41 mutually opposed with respect to the coil disk part 37 are different.

The yoke 42 is supported by the head housing 2, is disposed above the magnets 41 positioned below, and enhances the magnetic force of the magnets 41. The magnetic flux generated from the magnets 41 passes through the coil disk part 37 in the top-bottom direction orthogonal to the radial direction. When an electric current is being supplied from the brushes 35 to the coil disk part 37, since the flowing direction of the electric current at the part through which the magnetic flux passes in the coil pattern 37A is the radial direction orthogonal to the magnetic flux, force is generated in tangential directions which are the directions orthogonal to the top-bottom direction and the radial direction. This generated force generates, in the coil disk part 37, torque in the circumferential direction about the output shaft part 31, and the rotor 33 is rotated.

As shown in FIG. 2, a pair of the brushes 35 is provided at diagonal positions whose center is the output shaft part 31, and the brushes are supported by the head housing 2 movably in the top-bottom direction. The brushes 35 are biased toward the side of the commutator disk 36 (lower side) by springs 35A so that the lower surfaces thereof abut the commutator patterns 36A on the commutator disk 36.

As shown in FIG. 1, the pipe part 4 connects the head housing 2 and the power-supply part 6, and the handle part 5 is disposed between the head housing 2 and the power-supply part 6.

The handle part 5 has an arm 51 having a pair of arm parts, handles 52 disposed at the distal ends of the pair of arm parts of the arm 51, and a throttle 53, which is provided on one of the handles 52 and carries out output adjustment of the disk motor 3.

A battery 61 serving as a power supply is detachably provided in the power-supply part 6. Wiring is inserted in the pipe part 4, and the electric power supplied by the power-supply part 6 from the battery 61 is connected to the brushes 35 via the wiring.

The mowing blade 7 is formed to have an approximately circular plate shape, saw teeth are formed on the periphery thereof, and a hole (not shown) attached to the output shaft part 31 is formed at approximately center part of the circular plate shape.

A worker can adjust the electric power supplied from the battery 61 to the disk motor 3 by operating the throttle 53. In this manner, the disk motor 3 is rotated, and the mowing blade 7 is driven to rotate.

In the disk motor 3 having the above-described configuration, the positioning pins 39 carry out positioning of the coil disk part 37 and the flange 32. Since the positioning pins 39 are provided at the positions away from the commutator patterns 36A and the coil patterns 37A on a plane, positioning of the flange 32 (output shaft part 31) and the coil disk part 37 can be easily carried out while maintaining insulating performance. Also, since the coil disk part 37 and the commutator disk 36 are connected with the plurality of conductive pins 40, positioning of the commutator disk 36 with respect to the coil disk part 37 (output shaft part 31) is carried out by the conductive pins 40. Therefore, positioning of the output shaft part 31, the coil disk part 37, and the commutator disk 36 can be carried out by the positioning pins 39 while maintaining insulating performance. The base material of the positioning pins 39 may be, for example, a resin having insulating properties.

As shown in FIG. 3, the positioning pin 39 is disposed across only the flange 32 and the coil disk part 37 and does not reach the commutator disk 36. Therefore, a hole into which the positioning pin 39 is to be inserted is not required to be formed in the commutator disk 36, and the configuration thereof can be simplified.

Furthermore, with respect to the attachment of the commutator disk 36 and the coil disk part 37 to the flange 32, this attachment is carried out by inserting the cylindrical part 32A into the insertion holes 36a and 37a formed respectively in the commutator disk 36 and the coil disk part 37 and bonding the commutator disk 36, the coil disk part 37, and the circular plate part 32B. By virtue of such a configuration, the commutator disk 36 and the coil disk part 37 can be easily attached/fixed to the flange 32.

Also, the commutator disk 36 and the coil disk part 37 are connected to each other with the conductive pins 40 via the insulating holes 32a of the flange 32. Since the insulating holes 32a are formed to have long-hole shapes and are configured so that the inner surfaces thereof are away from the conductive pins 40 by the predetermined distance, the contact between the inner surfaces of the insulating holes 32a and the conductive pins 40 is prevented, and the electrical short-circuit of the flange 32, the commutator disk 36, and the coil disk part 37 is prevented. Note that the above-described predetermined distance is a value set in accordance with, for example, an applied voltage and is not limited to 2.4 mm described above.

In the flange 32, the insulating holes 32a are formed so that the three conductive pins 40 are inserted in each insulating hole 32a in each of the regions A to D. When the insulting holes 32a are configured in this manner, the three conductive pins 40 can penetrate therethrough without forming a plurality of holes, and formation of the insulating holes 32a in the flange 32 is facilitated. Moreover, since the three conductive pins 40 penetrate through each of the insulating holes 32a, the size of the insulating hole 32a inevitably becomes large.

When the size of the insulating hole 32a becomes large, the distance from the conductive pin 40 to the insulating hole 32a can be easily increased.

Figure 5:
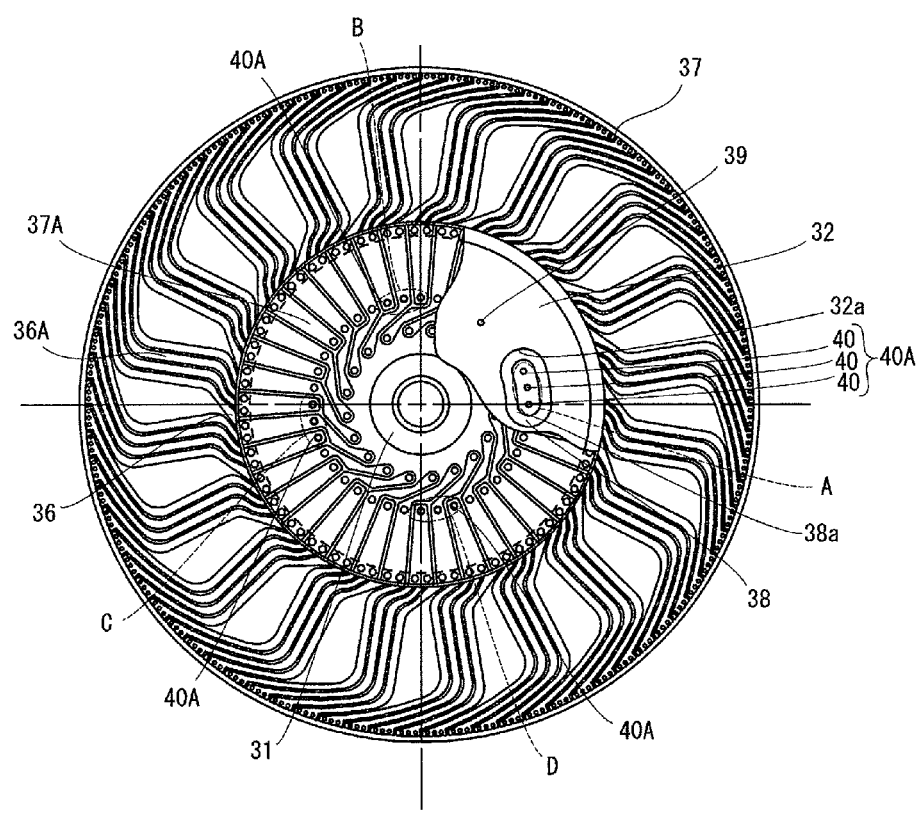
FIG. 5 is a partially-cut-away plan view showing a rotor and a flange of a disk motor of a first modification example of the electric power tool according to the embodiment of the present invention.

The disk motor and the electric power tool according to the present invention are not limited to the above-described embodiment, and various improvements and modifications can be made within the scope described in claims. For example, as shown in FIG. 5, as a first modification example, the flange-side positioning holes and the disk-side positioning holes may be formed so that each of the positioning pins 39 is disposed between the mutually adjacent conductive pin groups 40A (between the regions A to D). By virtue of such a configuration, the positioning pins 39 can be disposed at redundant part, and the degree of freedom in designing can be increased.

Figure 6:
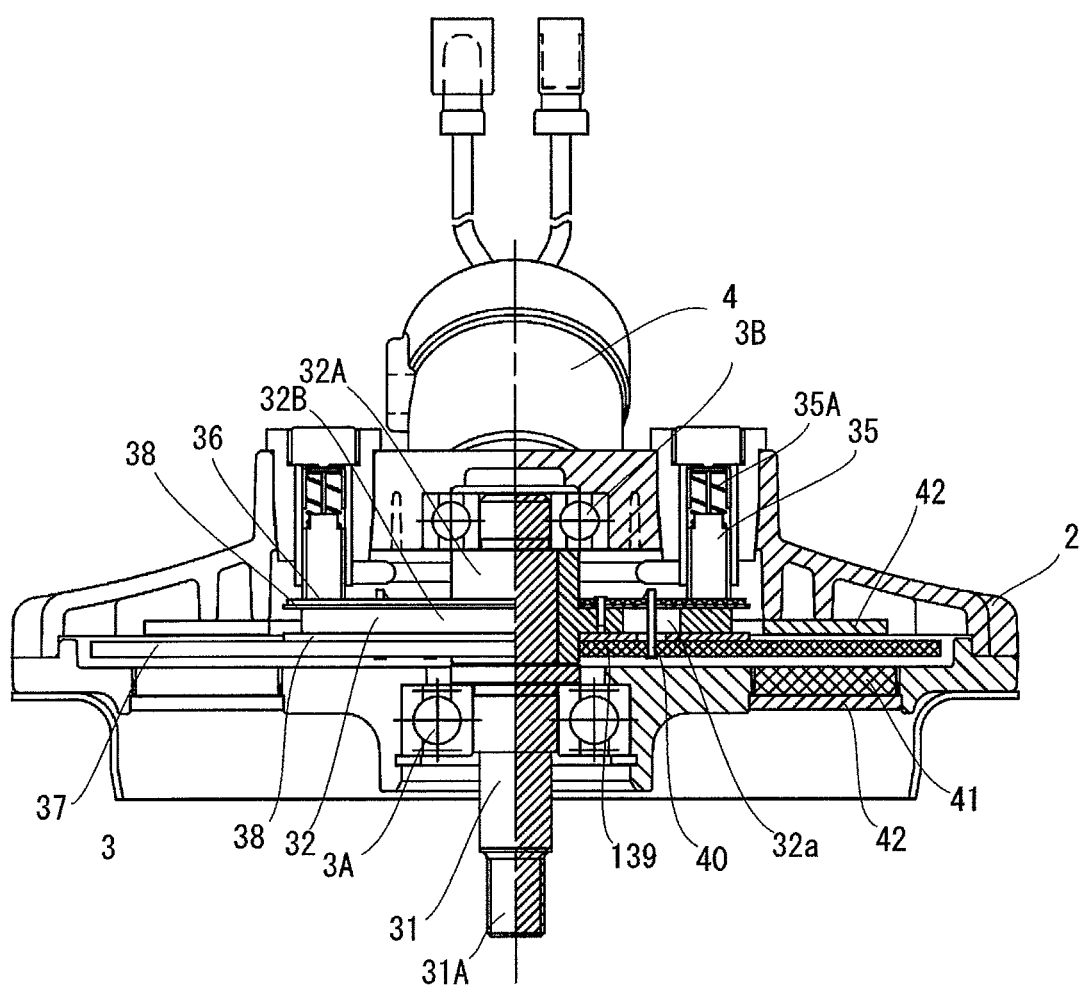
FIG. 6 is a cross-sectional view of a head housing of a second modification example of the electric power tool according to the embodiment of the present invention.

In the present embodiment, the positioning pin is provided across only the coil disk and the flange. However, as long as insulating properties are maintained, a positioning pin 139 may be provided across, for example, the commutator disk 36 and the flange 32 as shown in FIG. 6 as a second modification example, and the positioning pin may be provided across the commutator disk, the flange, and the coil disk.

What is claimed is:

1. A disk motor comprising:
an output shaft part;
a coil disk provided with a coil pattern and provided coaxially to the output shaft part;
a commutator disk provided with a commutator pattern and provided coaxially to the output shaft part; and
a positioning part electrically insulated from the coil pattern and the commutator pattern and carrying out positioning of either one or both of the coil disk and the commutator disk with respect to the output shaft part in a rotating direction, wherein:
the output shaft part has a flange rotating coaxially and integrally,
the coil disk and the commutator disk are attached to the flange,
the positioning part is a positioning pin configured in a pin shape,
in either one or both of the coil disk and the commutator disk, a disk-side positioning hole into which the positioning part is inserted is formed, and
a flange-side positioning hole into which the positioning pin is inserted is formed in the flange.

2. The disk motor according to claim 1,
wherein the coil disk is disposed on a first-end side in an axial direction of the flange,
the commutator disk is disposed on a second-end side in the axial direction of the flange, and
the positioning part is engaged across only the flange and the coil disk.

3. A disk motor comprising:
an output shaft part;
a coil disk provided with a coil pattern and provided coaxially to the output shaft part;
a commutator disk provided with a commutator pattern and provided coaxially to the output shaft part; and
a positioning part electrically insulated from the coil pattern and the commutator pattern and carrying out positioning of either one or both of the coil disk and the commutator disk with respect to the output shaft part in a rotating direction, wherein:
the output shaft part has a flange rotating coaxially and integrally,
the coil disk and the commutator disk are attached to the flange,
a coil-side through hole is formed in the coil disk,
a commutator-side through hole is formed in the commutator disk, and
a conductive part electrically connecting the coil disk and the commutator disk is inserted in the coil-side through hole and the commutator-side through hole.

4. The disk motor according to claim 3,
wherein an insulating hole in which the conductive part is inserted is formed in the flange, and
the insulating hole is formed so that an inner surface defining the insulating hole and the conductive part are away from each other by a predetermined distance or more.

5. The disk motor according to claim 4,
wherein the conductive part is composed of a conductive member group including a plurality of conductive members, and
the conductive member group is inserted in one insulating hole.

6. The disk motor according to claim 3,
wherein the conductive part has a plurality of conductive member groups, each group including a plurality of conductive members, and
the positioning part is disposed between the conductive member groups mutually adjacent in a circumferential direction of the output shaft part.

7. The disk motor according to claim 5,
wherein the coil disk has an input terminal and an output terminal conducted to a coil constituting the coil pattern, and
in the plurality of conductive members, a first conductive member and a second conductive member adjacent to the first conductive member are connected to the input terminal and the output terminal, respectively.

8. An electric power tool comprising:
a disk motor; and
a distal-end tool attachment part capable of attaching a distal-end tool thereto and driven by the disk motor, wherein:
the disk motor includes:
an output shaft part;
a coil disk provided with a coil pattern and provided coaxially to the output shaft part;
a commutator disk provided with a commutator pattern and provided coaxially to the output shaft part; and
a positioning part electrically insulated from the coil pattern and the commutator pattern and carrying out positioning of either one or both of the coil disk and the commutator disk with respect to the output shaft part in a rotating direction, wherein:
the output shaft part has a flange rotating coaxially and integrally,
the coil disk and the commutator disk are attached to the flange,
the positioning part is a positioning pin configured in a pin shape,
in either one or both of the coil disk and the commutator disk, a disk-side positioning hole into which the positioning part is inserted is formed, and
a flange-side positioning hole into which the positioning pin is inserted is formed in the flange.

* * * * *